United States Patent [19]
Stewart, Sr.

[11] Patent Number: 5,008,971
[45] Date of Patent: Apr. 23, 1991

[54] WINDSHIELD WIPER ARM

[75] Inventor: Kenneth W. Stewart, Sr., Columbus, Miss.

[73] Assignee: United Technologies Electro Systems, Inc., Columbus, Miss.

[21] Appl. No.: 424,487

[22] Filed: Oct. 20, 1989

[51] Int. Cl.⁵ .............................................. B60S 1/34
[52] U.S. Cl. ............................ 15/250.2; 15/250.31; 15/250.34
[58] Field of Search ........... 15/250.20, 250.34, 250.35, 15/250.31, 250.19

[56] References Cited

U.S. PATENT DOCUMENTS

| | | | |
|---|---|---|---|
| 1,783,582 | 12/1930 | Oishei et al. | 15/250.34 |
| 2,295,620 | 9/1942 | Zaiger | 15/250.34 |
| 2,311,121 | 2/1943 | Nette et al. | 15/250.20 |
| 2,312,278 | 2/1943 | Zaiger | 15/250.35 |
| 2,312,279 | 2/1943 | Zaiger | 15/250.35 |
| 2,602,950 | 7/1952 | Sacchini | 15/250.20 |
| 4,750,235 | 6/1988 | Scorsiroli | 15/250.34 |

Primary Examiner—Harvey C. Hornsby
Assistant Examiner—Gary K. Graham

[57] ABSTRACT

The tension of a windshield wiper is adjusted by turning a nut which adjusts the rotational tension of a spring on the arm. The positioning of the nut is fixed by a second nut, a spring also forces the arm into a detent, holding the arm away from the windshield.

5 Claims, 1 Drawing Sheet

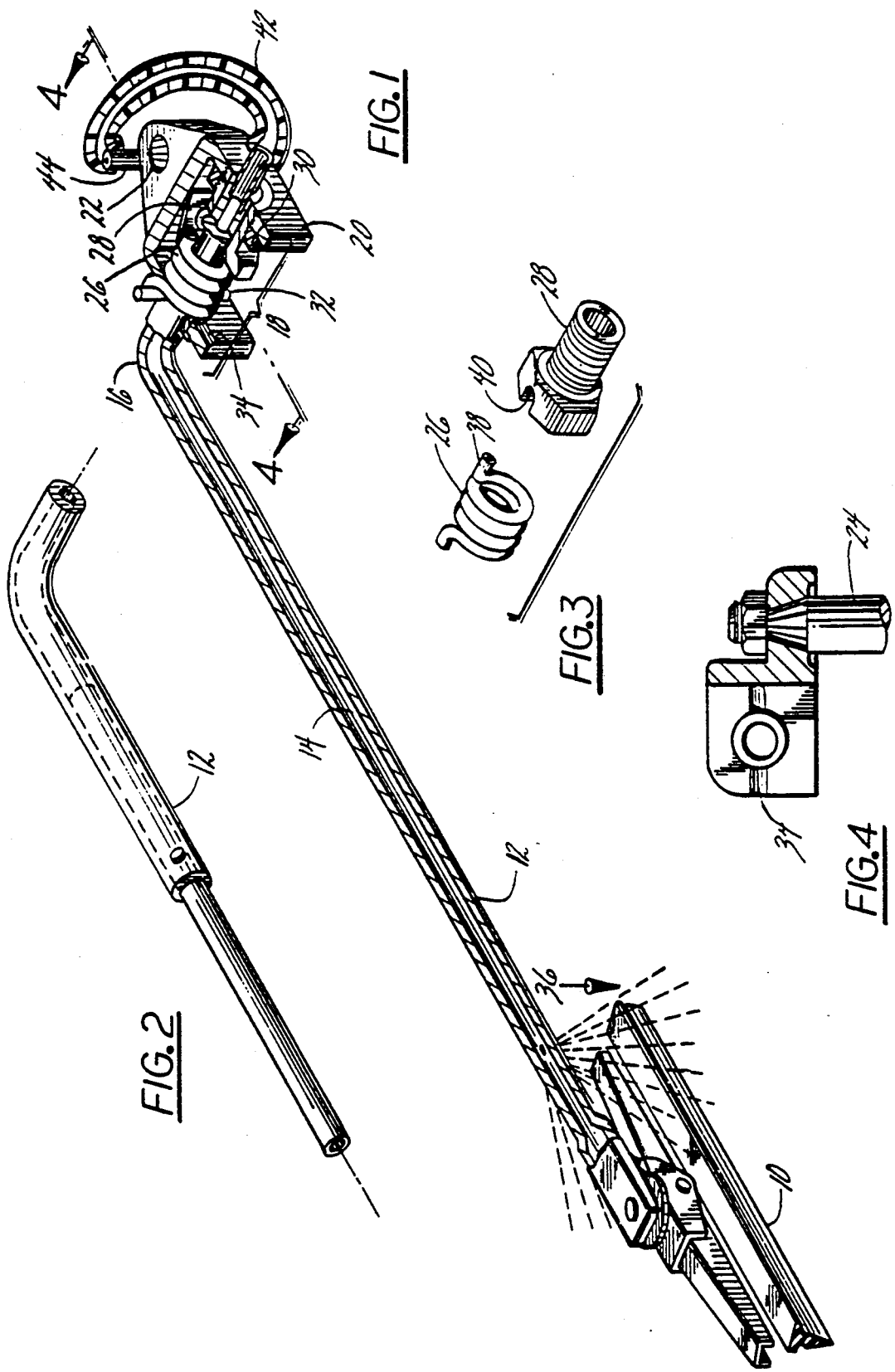

WINDSHIELD WIPER ARM

TECHNICAL FIELD

This invention relates to windshield wiper arms for vehicles such as automobiles and tractors.

BACKGROUND OF THE INVENTION

As is frequently found on many automobiles, a windshield wiper arm presses a wiper blade against the windshield and the tension is controlled by a simple, non-adjustable retraction spring. Usually, the wiper arm can be positioned away from the windshield (to service the wiper blade) by moving the arm to a position at which the retraction spring is not effective. The arm, however, cannot be said to be securely held away from the windshield at that point. On some vehicles, the arm must be held away from the windshield against the pull of the retraction spring.

DISCLOSURE OF THE INVENTION

It is an object of the present invention to provide an improved windshield wiper arm.

According to the present invention a windshield wiper arm is rotated in a carrier to move it away from the windshield. Arm tension is controlled by the rotation of a coil spring. The spring's tension is controlled by a bolt which engages one end of this spring. The other end of the spring engages the wiper arm. By rotating the bolt, the tension of the arm is adjusted. The bolt is held in place by a lock nut that is tightened against the carrier. The spring also engages the arm in such a way as to force a detent on the arm against the carrier, and the carrier contains a recess to receive the detent. The location of the recess defines the location in which the arm is held away from the windshield. In this manner, the arm is positively held away from the windshield. The arm may be tubular, allowing it to rotate on itself in the carrier and also carry windshield cleaning fluid.

BRIEF DESCRIPTION OF THE DRAWING

FIG. 1 is a cut away view of a windshield wiper carrier and arm assembly incorporating the present invention, FIG. 2 shows an alternative embodiment of a windshield wiper arm that may be used in the assembly shown in FIG. 1, FIG. 3 is an exploded view of the spring and tensioning bolt, which comprise a portion of the assembly shown in FIG. 1; and FIG. 4 a cut away view along line 4 in FIG. 1, and shows the wiper arm carrier but excluding the spring and bolt shown in FIG. 3.

BEST MODE FOR CARRYING OUT THE INVENTION

Referring to FIG. 1, a typical windshield wiper blade 10 is attached to an arm 12 which consists of a hollow tube providing a passage 14 for windshield cleaning fluid. The tube 12 is roughly angled at point 16° at 90° and the portion of the tube 18 rests in a carrier 20. Being circular, the tube can rotate (on itself) in the carrier. The carrier 20 contains a hole 22 which is intended to receive the splined end of a rotating shaft 24 (shown in FIG. 4) which is part of conventional reciprocating windshield wiper drive (the details are not shown, being that it is widely used).

Contained within the carrier is a coil spring 26, a tensioning bolt 28 and a locking bolt 30. The tube 12 extends through the spring.

The tube 12 contains a detent 32 and the carrier contains a recess 34 (see also FIG. 4) which receives this detent when the arm (tube 12) is rotated.

Referring carefully to FIG. 1, it should be observed that one end of the spring 26 engages the detent 32 and the spring is wound so that the force exerted by it on the detent cause the arm to rotate in direction 36 against the windshield. The other end 38 of the spring (FIG. 3) fits in a slot 40 in the bolt 28. The bolt 28 is threaded into the carrier 20 and carries a locking nut 30. By turning the nut 40, the tension of the spring on the arm can be increased or decreased, and, when the proper tension is achieved, the locked nut 30 is tightened, to hold the bolt 28 in place on the carrier.

From FIG. 4 it can also be seen that there is a small flexible tube 42 which fits over the end of the tube 12, and it is through this tube that the windshield wiper cleaning fluid is injected from a washer pump (not shown) into the passage 14. Although not shown it can be easily understood that a connection is made to the tube 42 through a nipple 44, which is part of the vehicle (i.e. stationary relative to the carrier).

From the foregoing description and explanation of the invention, one skilled in the art will be able to make modifications and variations to the invention in whole or in part without departing from the true scope and spirit of the invention. For instance, as shown in FIG. 2, the arm 12 may be adjustable.

I claim:

1. A windshield wiper arm for attachment to a wiper arm drive shaft that rotates the arm on a windshield, characterized by:

a wiper arm carrier adapted to fit on the wiper arm drive shaft;

a rod which is rotatably mounted on the carrier and rotatable on the carrier between a first position for causing the wiper to strike the windshield and a second position a fixed distance from the windshield;

resilient means for rotatably holding the rod in tension on the windshield;

detent means on the carrier;

detent engagement means on the rod for engaging the detent means to hold the rod in the second position away from the windshield;

tensioning means engaging the carrier, the rod and the resilient means for adjusting the tension of the rod on the windshield, and the resilient means forcing the detent engagement means into the detent.

2. The windshield wiper arm described in claim 1, characterized in that:

the resilient on means is a coil spring with two opposed ends, one end engaging the rod and the other end engaging the tensioning means.

3. The windshield wiper arm described in claim 2, characterized in that:

the tensioning means comprises a bolt threaded into the carrier and a nut on the bolt for tightening the bolt in place on the carrier, the bolt having a cylindrical passage adapted to receive the rod;

the rod extends through the nut and rotates in the passage;

one end of the spring engages the nut; and the other end of the spring engages the rod;

whereby the tension of the rod on the windshield may be adjusted by rotating the bolt and tightening the bolt on the carrier.

4. The windshield wiper arm described in claim 3, characterized in that:

the detent means comprises a pin that engages one end of the spring; and the detent engagement means comprises a slot to receive the pin.

5. The windshield wiper arm described in claim 4, characterized in that:

a first segment of the rod rotates in said passage and is angled approximately 90 degrees from a segment receiving the windshield wiper.

* * * * *

UNITED STATES PATENT AND TRADEMARK OFFICE
CERTIFICATE OF CORRECTION

PATENT NO. : 5,008,971

DATED : April 23, 1991

INVENTOR(S) : Kenneth W. Stewart, Sr.

It is certified that error appears in the above-identified patent and that said Letters Patent is hereby corrected as shown below:

Col. 1, line 61, "16°" should read --16--.

Col. 1, line 65, "splined" should read --spliced--.

Claim 2, col. 2, line 56, "resilient on means" should read --resilient means--.

Signed and Sealed this

Twenty-ninth Day of September, 1992

Attest:

DOUGLAS B. COMER

*Attesting Officer*  *Acting Commissioner of Patents and Trademarks*